(12) United States Patent
Li

(10) Patent No.: US 9,083,912 B2
(45) Date of Patent: Jul. 14, 2015

(54) METHOD AND APPARATUS FOR ENABLING PARALLEL PROCESSING OF PIXELS IN AN IMAGE

(71) Applicant: Xerox Corporation, Norwalk, CT (US)

(72) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 374 days.

(21) Appl. No.: 13/670,276

(22) Filed: Nov. 6, 2012

(65) Prior Publication Data

US 2014/0125681 A1    May 8, 2014

(51) Int. Cl.
*G09G 5/02* (2006.01)
*H04N 1/405* (2006.01)
*G09G 3/20* (2006.01)

(52) U.S. Cl.
CPC ........... *H04N 1/4052* (2013.01); *G09G 3/2059* (2013.01)

(58) Field of Classification Search
CPC .............................................. G09G 5/02–5/028
USPC .................. 345/596, 597, 598; 358/3.06, 534
See application file for complete search history.

(56) References Cited

U.S. PATENT DOCUMENTS

| 5,271,070 A * | 12/1993 | Truong et al. ................. 382/234 |
| 5,353,127 A | 10/1994 | Shiau et al. |
| 8,451,502 B2 * | 5/2013 | Guermont ..................... 358/3.06 |
| 2011/0109680 A1 * | 5/2011 | Mizutani ......................... 347/15 |

* cited by examiner

*Primary Examiner* — Jacinta M Crawford

(57) ABSTRACT

A method, non-transitory computer readable medium, and apparatus for enabling parallel processing of pixels in an image are disclosed. For example, the method performs, via a multiple core processor, a one-dimensional error diffusion on the pixels in the image to reduce a number of bits per pixel to a value lower than an initial number of bits per pixel and greater than one, and performs a two-dimensional error diffusion on the pixels in the image that have undergone the one-dimensional error diffusion, to reduce the number of bits per pixel to one bit per pixel.

18 Claims, 2 Drawing Sheets

METHOD AND APPARATUS FOR ENABLING PARALLEL PROCESSING OF PIXELS IN AN IMAGE

The present disclosure relates generally to reducing boundary artifacts in an image and, more particularly, to a method and an apparatus for enabling parallel processing of pixels in an image.

BACKGROUND

To reduce cost and improve flexibility, multi-function printer manufacturers have been pursuing software based image paths. One significant performance bottleneck is error diffusion. Error diffusion is serial or sequential by nature. As a result, the nature of the error diffusion operation hinders parallel processing otherwise made possible with multiple core processors in current computing devices.

Other methods attempt to take advantage of multiple core processors by dividing an image into smaller sections and then performing two-dimensional error diffusion on each smaller section. Subsequently, the image is patched back together. However, these methods are generally inefficient and generally produce an image that is not acceptable for use in most real products.

SUMMARY

According to aspects illustrated herein, there are provided a method, a non-transitory computer readable medium, and an apparatus for enabling parallel processing of pixels in an image. One disclosed feature of the embodiments is a method that performs, via a multiple core processor, a one-dimensional error diffusion on the pixels in the image to reduce a number of bits per pixel to a value lower than an initial number of bits per pixel and greater than one, and performs a two-dimensional error diffusion on the pixels in the image that have undergone the one-dimensional error diffusion, to reduce the number of bits per pixel to one bit per pixel.

Another disclosed feature of the embodiments is a non-transitory computer-readable medium having stored thereon a plurality of instructions, the plurality of instructions including instructions which, when executed by a processor, cause the processor to perform a method that performs, via a multiple core processor, a one-dimensional error diffusion on the pixels in the image to reduce a number of bits per pixel to a value lower than an initial number of bits per pixel and greater than one, and performs a two-dimensional error diffusion on the pixels in the image that have undergone the one-dimensional error diffusion, to reduce the number of bits per pixel to one bit per pixel.

Another disclosed feature of the embodiments is an apparatus comprising a processor that is configured to perform a one-dimensional error diffusion on the pixels in the image to reduce a number of bits per pixel to a value lower than an initial number of bits per pixel and greater than one, and to perform a two-dimensional error diffusion on the pixels in the image that have undergone the one-dimensional error diffusion, to reduce the number of bits per pixel to one bit per pixel.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for enabling parallel processing of pixels in an image. As discussed above, to reduce cost and improve flexibility, multi-function printer (MFP) manufacturers have been pursuing software based image paths. Typically, MFP manufactures will deploy a custom ASIC chip to perform image processing functions. Removing the use of ASIC chips and using the multi-core processors that are already in the MFP instead to perform image processing functions can significantly save costs. By utilizing a software based image path, the image processing algorithms or methods may also be modified and adjusted easily.

In contrast, changes to the algorithms in ASIC chips cannot be made. In addition, the cost to re-do an ASIC chip is high and the cycle is typically long. As a result, a software based image path provides a much more flexible approach.

One challenge in a software based image path is to implement the error diffusion function. Multi-core processors provide a much improved performance over single-core processors through parallel processing. As two-dimensional error-diffusion is sequential by nature, it presents a bottleneck to multi-core processor processing.

There have been methods proposed to divide the input image, perform error diffusion separately on the image parts and then stitch the results back together, but there are boundary artifacts associated with these methods. Other methods only perform one-dimensional error diffusion to reduce the bits per pixel straight to one bit per pixel (e.g., 8 bits per pixel directly to 1 bit per pixel). However, reducing the bits per pixel from 8 to 1 directly only using one-dimensional error diffusion produces an image that is not acceptable for most print jobs.

One embodiment of the present disclosure provides a method for enabling parallel processing of pixels in an image. In one embodiment, the two-stage error diffusion method uses a combination of one-dimensional and two-dimensional error diffusion. As a result, the parallel processing capabilities of multiple core processors may be utilized and the processing required by the marking engine for two-dimensional error diffusion can be greatly reduced. Additionally, the resulting image quality is sufficient for most print jobs and comparable to the image quality obtained by full two-dimensional error diffusion methods.

Figure 1:
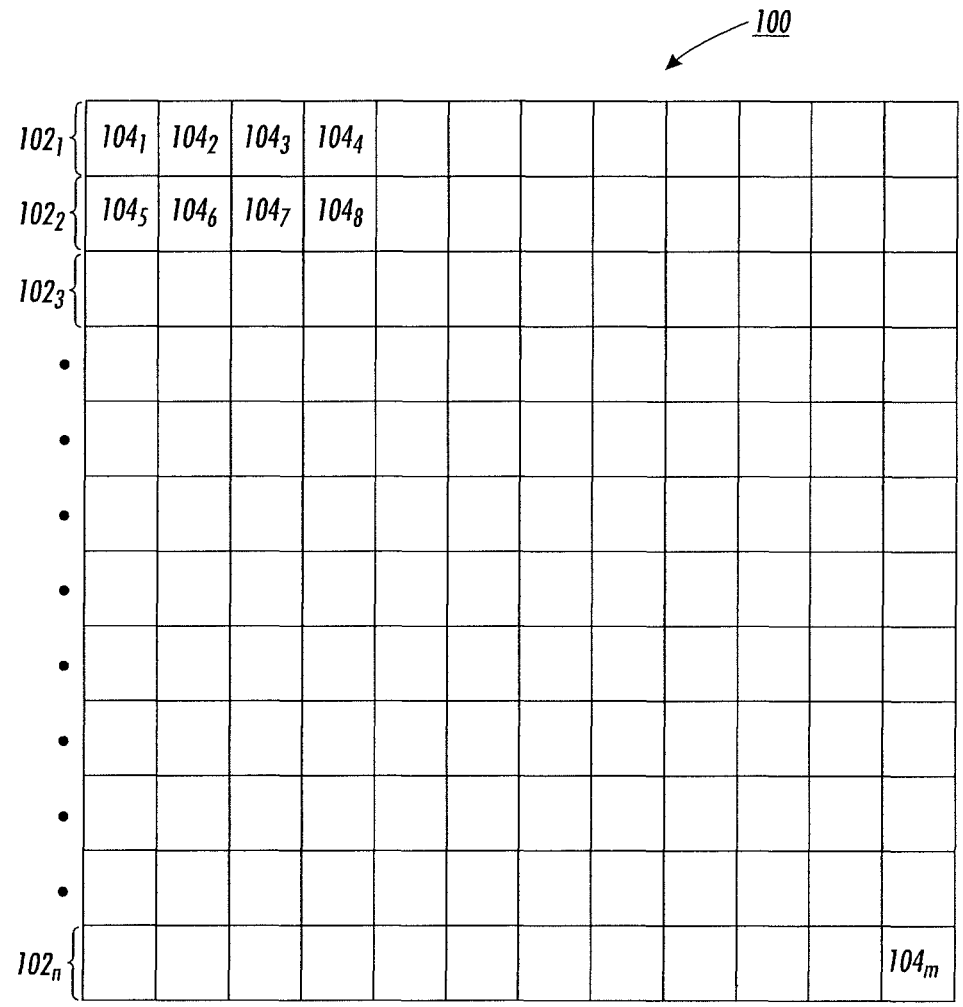
FIG. 1 illustrates one example of an image.

FIG. 1 illustrates one example of an image 100. The image 100 may be a color image or a grayscale image. The image 100 may be composed of a plurality of pixels $104_1$ to $104_m$. The plurality of pixels $104_1$ to $104_m$ may also be grouped into one or more lines $102_1$ to $102_n$ (e.g., raster scan lines).

One embodiment of the present disclosure performs a two-stage error diffusion method that uses a combination of one-dimensional error diffusion and two-dimensional error diffusion. Error-diffusion in general is associated with a concept of reducing a number of bits in a pixel and spreading an error associated with the reduction of bits across other pixels.

For example, a pixel may be reduced from 8 bits to 2 bits. A pixel with an 8 bit input may have a value between 0 to 255. Predefined thresholds may be set at 64, 128 and 192 to reduce the 8 bit value to a two bit value. As a result, any pixel with an 8 bit value between 0 and 63 may be set to 00, any pixel with an 8 bit value between 64 and 127 may be set to 01, any pixel with an 8 bit value between 128 and 191 may be set to 10 and any pixel with an 8 bit value between 192 and 255 may be set to 11. Thus, if the pixel value is 200, the pixel may have, for example, a two bit value of 11 and the error would have a value of 55.

Using the above example, one-dimensional error diffusion would consist of spreading the error value of 55 across each pixel, e.g., pixels $104_1$, $104_2$, $104_3$, $104_4$, and so forth, within a single line, for example, the line $102_1$. For example, if the pixel $104_1$ was examined with the error value of 55, the error value of 55 could be added to the pixel $104_2$ and the process may be repeated for each pixel in the line $102_1$.

One-dimensional error diffusion provides the ability for each line $102_1$ to $102_n$ to be processed individually in parallel, i.e., at the same time period. In other words, the one-dimensional error diffusion may be performed on multiple lines of the lines $102_1$ to $102_n$ simultaneously using a multi-core processor.

In one embodiment, the present disclosure uses a multi-core processor to perform one-dimensional error diffusion on the image 100 to reduce the number of bits per pixel. However, the one-dimensional error diffusion is not performed down to the final one bit level. In other words, the number of bits per pixel is reduced from an initial value to any value greater than 1. Said another way, the present disclosure does not perform the full one-dimensional error diffusion to reduce the number of pixels down to 1. As noted above, the full one-dimensional error diffusion provides a low quality image that is not acceptable for most print jobs.

Using the above example again, the two-dimensional error diffusion may spread the error value of 55 across multiple pixels across multiple lines. For example, if the pixel $104_3$ is being analyzed, ½ of the error value of 55 may be applied to the pixel $104_4$ (pixel to the right), ¼ of the error value of 55 may be applied to the pixel $104_8$ (pixel to the lower right) and ¼ of the error value of 55 may be applied to the pixel $104_7$ (pixel directly below).

In one embodiment of the present disclosure, after the one-dimensional error diffusion is performed on the image 100, the two-dimensional error diffusion may be performed on the image 100 to reduce the number of bits per pixel down to 1. Thus, if the one-dimensional error diffusion were to reduce the number of bits per pixel from 8 to 2, the two-dimensional error diffusion would reduce the number of bits per pixel from 2 to 1.

In one embodiment, the two-dimensional error diffusion may be performed at the time of marking. As a result, a marking engine would require less resources or processing power than previous methods that only use two-dimensional error diffusion. This would be because the processing of the present disclosure would require a reduction of 2 bits per pixel down to 1 bit per pixel as opposed to previous methods that may require a reduction of 8 bits per pixel down to 1 bit per pixel.

Any type of two-dimensional error diffusion algorithm may be used. In one example, a Shiau-Fan method may be used for the two-dimensional error diffusion. The Shiau-Fan method is disclosed in U.S. Pat. No. 5,353,127, assigned to Xerox® Corporation, and is herein incorporated by reference in its entirety.

As a result, a two-stage error diffusion method that uses a combination of the one-dimensional error diffusion and the two-dimensional error diffusion can be used to enable parallel processing without causing boundary artifacts. The two-stage error diffusion method can take advantage of lower cost and the flexibility of multiple core processors. As a result, the two-stage error diffusion method may be more efficient than currently available methods, while producing an image having a sufficiently high quality to be used in most print jobs.

Figure 2:
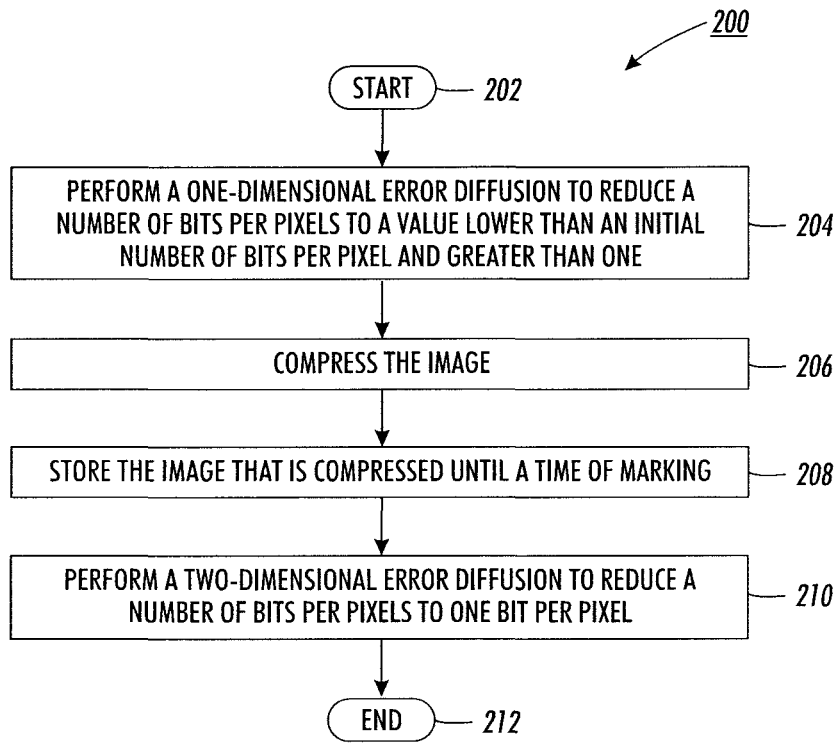
FIG. 2 illustrates an example of a flowchart of one embodiment of a method for enabling parallel processing of pixels in an image.
Figure 3:
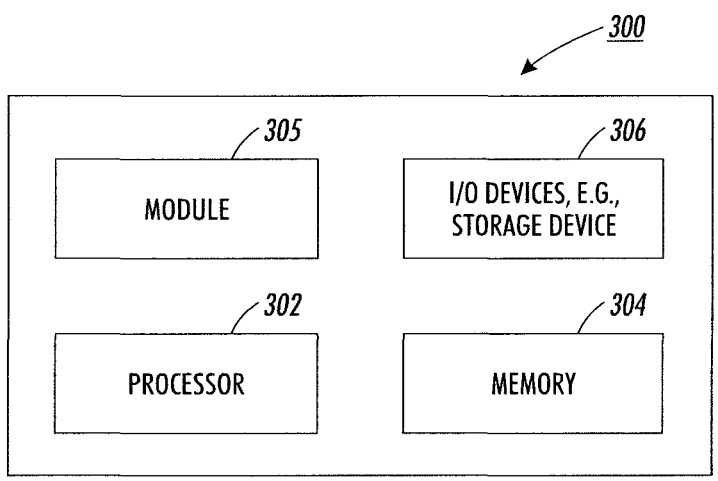
FIG. 3 illustrates a high-level block diagram of a general-purpose computer suitable for use in performing the functions described herein.

FIG. 2 illustrates a flowchart of a method 200 for enabling parallel processing of pixels in an image. In one embodiment, the method 200 may be performed by a general-purpose computer as illustrated in FIG. 3 and discussed below. The general-purpose computer may be a computer having a multiple-core processor (e.g., a dual core processor) and/or embodied as part of a marking engine.

The method 200 begins at step 202. At step 204, the method 200 performs a one-dimensional error diffusion to reduce a number of bits per pixel to a value lower than an initial number of bits per pixel and greater than 1. In other words, the one-dimensional error diffusion does not perform error diffusion down to the final one bit level. For example, the image may initially have 8 bits per pixel. In one embodiment, a multiple-core processor may be used to perform one-dimensional error diffusion on a plurality of lines of the image simultaneously at the same time. As result, the parallel processing power of multiple-core processors may be utilized during the one-dimensional error diffusion.

Thus, one-dimensional error diffusion would reduce each of the 8 bit pixels into 2 bit pixels. Although the example above illustrates performing one-dimensional error diffusion to reduce pixels from 8 bits to 2 bits, it should be noted that any reduction may be sufficient. For example, the one-dimensional error diffusion may be performed to reduce the number of bits per pixel from 8 bits to 4 bits or from 16 bits to 8 bits, and the like.

The method 200 may then perform optional steps 206 and 208. At optional step 206, the method 200 may compress the image after performing the one-dimensional error diffusion.

At optional step 208, the method 200 may store the image that is compressed until a time of marking. Said another way, the image that is processed to reduced the number of bits per pixel via the one-dimensional error diffusion may be compressed and stored until the image is ready for printing.

At step 210, the method 200 performs a two-dimensional error diffusion to reduce the number of bits per pixel to one bit per pixel. Any two-dimensional error diffusion may be applied. In one embodiment, the Shiau-Fan method may be used for the two-dimensional error diffusion. Notably, since the image processed in step 204 has the number of bits per pixel reduced (e.g., from 8 bits to 2 bits), the processing required by the marking engine to decompress the image and perform two-dimension error diffusion would be minimal. At a minimum, it would require less processing than typical methods performed on an image having the full number of bits per pixel. The method ends at step 212.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a processor element 302 (e.g., a CPU, GPU or GPGPU), a memory 304, e.g., random access memory (RAM) and/or read only memory (ROM), a module 305 for enabling parallel processing of pixels in an image, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps, functions, or operations of the above disclosed methods. In one embodiment, the present module or process 305 for enabling parallel processing of pixels in an image can be loaded into memory 304 and executed by processor 302 to implement the functions as discussed above. As such, the present method 305 for enabling parallel processing of pixels in an image (including associated data structures) of the present disclosure can be stored on a non-transitory (e.g., physical and tangible) computer readable storage medium, e.g., RAM memory, magnetic or optical drive or diskette and the like. For example, the hardware processor 302 can be programmed or configured with instructions (e.g., computer readable instructions) to perform the steps, functions, or operations of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for enabling parallel processing of pixels in an image, comprising:
   performing, via a multiple core processor, a one-dimensional error diffusion on the pixels in the image to reduce a number of bits per pixel to a value lower than an initial number of bits per pixel and greater than one, wherein the one-dimensional error diffusion comprises performing the one-dimensional error diffusion on a plurality of lines of the image simultaneously; and
   performing a two-dimensional error diffusion on the pixels in the image that have undergone the one-dimensional error diffusion, to reduce the number of bits per pixel to one bit per pixel, wherein the two-dimensional error diffusion comprises dividing an error into adjacent pixels on two different lines of the plurality of lines of the image.

2. The method of claim 1, wherein the one-dimensional error diffusion reduces the number of bits per pixel from eight bits per pixel to two bits per pixel.

3. The method of claim 1, further comprising:
   compressing the image after performing the one-dimensional error diffusion.

4. The method of claim 3, further comprising:
   storing the image that is compressed until a time of marking when the two-dimensional error diffusion is performed.

5. The method of claim 1, wherein the two-dimensional error diffusion is performed by a marking engine.

6. The method of claim 1, wherein the image is a color image.

7. The method of claim 1, wherein the image is a grayscale image.

8. The method of claim 1, wherein a Shiau-Fan method is used for the two-dimensional error diffusion.

9. A non-transitory computer-readable medium storing a plurality of instructions, which when executed by a multiple core processor, cause the multiple core processor to perform operations for enabling parallel processing of pixels in an image, the operations comprising:
   performing a one-dimensional error diffusion on the pixels in the image to reduce a number of bits per pixel to a value lower than an initial number of bits per pixel and greater than one, wherein the one-dimensional error diffusion comprises performing the one-dimensional error diffusion on a plurality of lines of the image simultaneously; and
   performing a two-dimensional error diffusion on the pixels in the image that have undergone the one-dimensional error diffusion, to reduce the number of bits per pixel to one bit per pixel, wherein the two-dimensional error diffusion comprises dividing an error into adjacent pixels on two different lines of the plurality of lines of the image.

10. The non-transitory computer-readable medium of claim 9, wherein the one-dimensional error diffusion reduces the number of bits per pixel from eight bits per pixel to two bits per pixel.

11. The non-transitory computer-readable medium of claim 9, further comprising:
    compressing the image after performing the one-dimensional error diffusion.

12. The non-transitory computer-readable medium of claim 11, further comprising:
    storing the image that is compressed until a time of marking when the two-dimensional error diffusion is performed.

13. The non-transitory computer-readable medium of claim 9, wherein the two-dimensional error diffusion is performed by a marking engine.

14. The non-transitory computer-readable medium of claim 9, wherein the image is a color image.

15. The non-transitory computer-readable medium of claim 9, wherein the image is a grayscale image.

16. The non-transitory computer-readable medium of claim 9, wherein a Shiau-Fan method is used for the two-dimensional error diffusion.

17. A method for enabling parallel processing of pixels in an image, comprising:
    performing simultaneously, via a multiple core processor, a one-dimensional error diffusion on a plurality of lines of the image to reduce a number of bits per pixel from eight bits per pixel to two bits per pixel, wherein the one-dimensional error diffusion comprises performing the one-dimensional error diffusion on a plurality of lines of the image simultaneously;
    compressing the image after performing the one-dimensional error diffusion;
    storing the image that is compressed until a time of marking; and performing, via a marking engine, a two-dimensional error diffusion on the image that is stored, to reduce the number of bits per pixel from two bits per pixel to one bit per pixel, wherein the two-dimensional error diffusion comprises dividing an error into adjacent pixels on two different lines of the plurality of lines of the image.

18. The method of claim 17, wherein a Shiau-Fan method is used for the two-dimensional error diffusion.

\* \* \* \* \*